E. JAGENBERG.
ARRANGEMENT FOR SEVERING SINGLE PIECES FROM A BAR OF BUTTER.
APPLICATION FILED MAR. 10, 1914.

1,132,938.

Patented Mar. 23, 1915.

E. JAGENBERG.
ARRANGEMENT FOR SEVERING SINGLE PIECES FROM A BAR OF BUTTER.
APPLICATION FILED MAR. 10, 1914.

1,132,938.

Patented Mar. 23, 1915.

2 SHEETS—SHEET 2.

UNITED STATES PATENT OFFICE.

EMIL JAGENBERG, OF DUSSELDORF, GERMANY.

ARRANGEMENT FOR SEVERING SINGLE PIECES FROM A BAR OF BUTTER.

1,132,938. Specification of Letters Patent. Patented Mar. 23, 1915.

Application filed March 10, 1914. Serial No. 823,674.

*To all whom it may concern:*

Be it known that I, EMIL JAGENBERG, manufacturer, a subject of the German Emperor, and residing at 107 Himmelgeisterstrasse, Dusseldorf, Germany, have invented certain new and useful Improvements in Arrangements for Severing Single Pieces from a Bar of Butter, of which the following is a specification.

The present invention relates to an arrangement for severing single pieces of butter from a bar of butter. The arrangement employs the known cutting wire in such a manner, that each piece of butter immediately after it has been severed from the bar, is removed and conveyed to the wrapping mechanism. Thereby a positive removing of the severed pieces of butter from the bar is obtained, which was not the case when, as hitherto customary, the severed pieces were advanced to a certain distance remaining behind each other, as then, particularly when the butter was soft, the pieces would easily again stick together, so that their removal became more difficult. The arrangement according to the present invention furthermore works in such a manner, that the piece of butter severed is quickly removed from the intermittently advanced bar of butter immediately after the cutting member has been moved down for the severing operation, the cutting member then rises somewhat slower advancing in the direction of the feed, and the bar of butter is advanced still slower. The three parts thus move, after the severing operation, simultaneously and in such a manner, that they are instantly separated from each other, so that they will not obstruct each other, and a very rapid working can be obtained.

Figure 1:
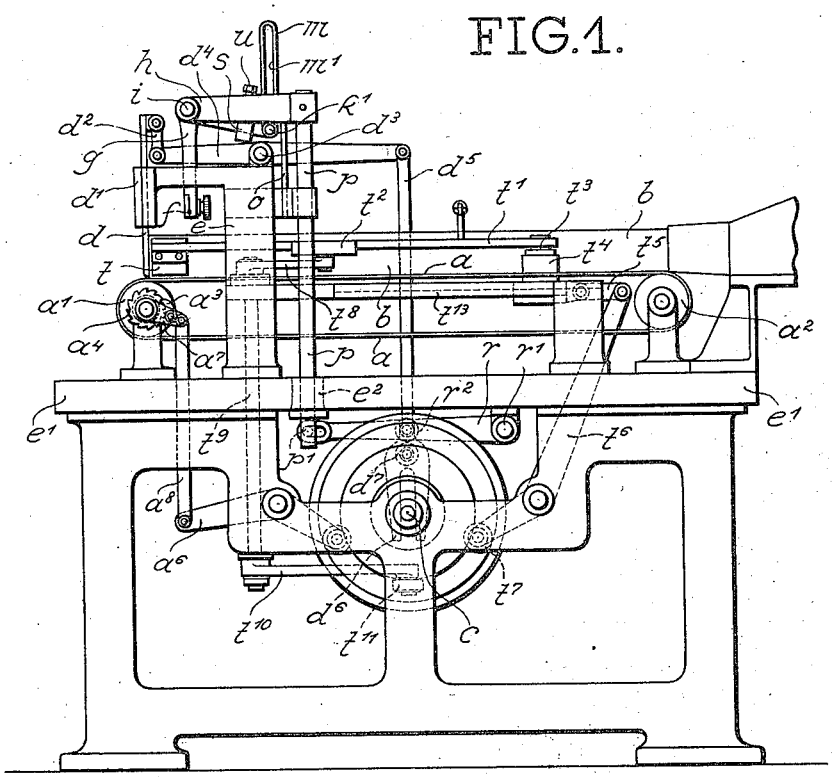
Figure 2:
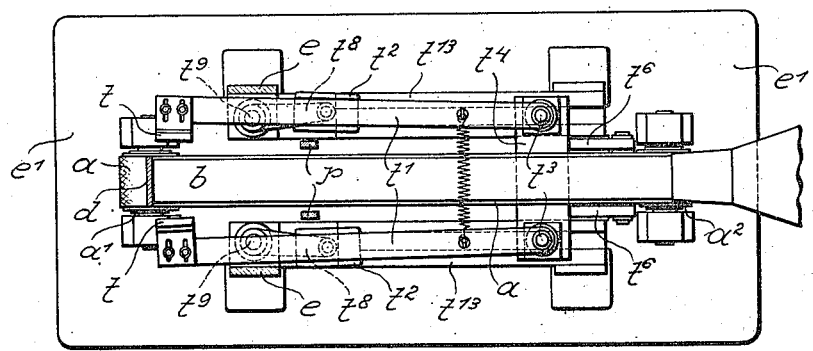
Figure 3:
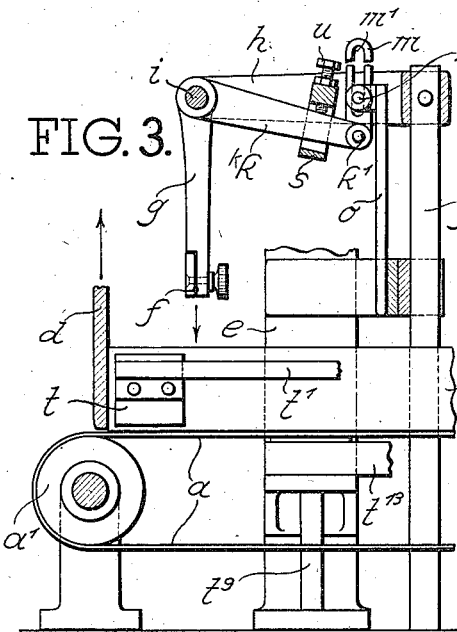
Figure 4:
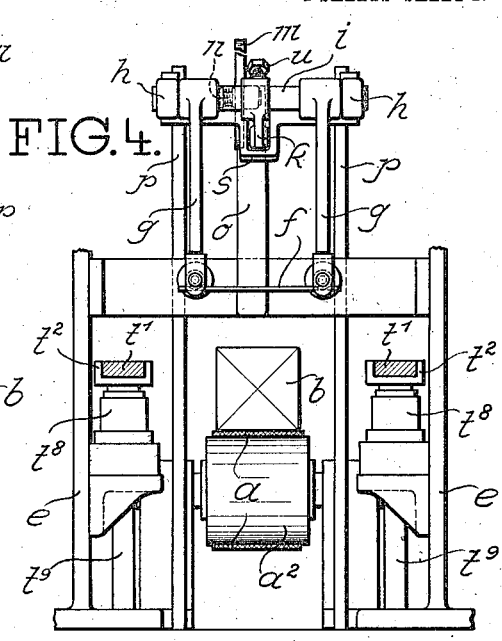
Figure 5:
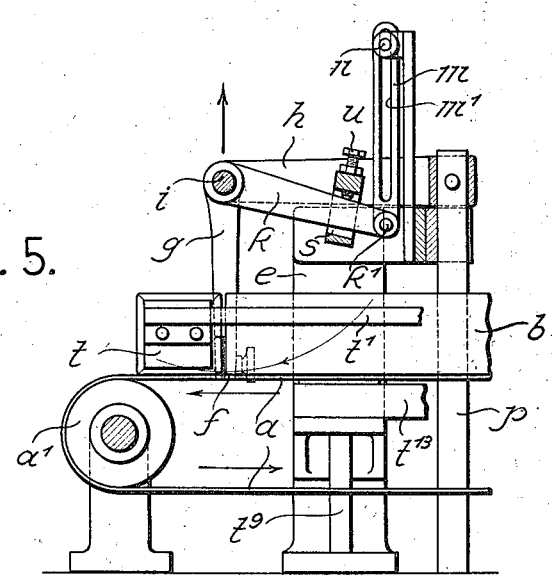
Figure 6:
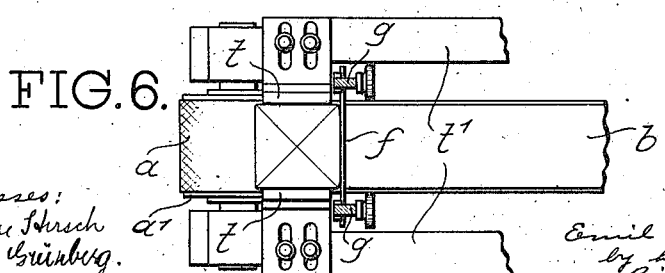

In the accompanying drawing Figure 1 is a side elevation of the machine. Fig. 2 is a plan. Fig. 3 is a side elevation of the severing arrangement. Fig. 4 is a front elevation thereof, Fig. 5 is a side elevation of the severing arrangement in another operative position and Fig. 6 a plan of part of Fig. 5.

On the well moistened conveyer band $a$, which runs over the rollers $a^1$, $a^2$ the bar of butter $b$ is intermittently advanced up to the vertically reciprocating slide $d$. The intermittent motion of the conveyer band is produced by means of the pawl $a^3$, which engages in the ratchet wheel $a^4$ and is rocked to and fro by the lever $a^5$ operated by a cam, the said lever $a^5$ coupled by a rod $a^6$ to the rocker arm $a^7$ of said pawl. The slide $d$ is fitted in a fixed guide $d^1$ and is coupled at the top by means of a link $d^2$ with a lever $d^4$ pivotally secured at $d^3$, which lever is again coupled to a bar $d^5$ having at its end a fork $d^6$ straddling the shaft $c$ and a roller $d^7$ bearing against a cam disk. This slide $d$ rises by the operation of the bar $d^5$ which moves downward, when the bar of butter $b$ meets the slide, and immediately the cutting wire begins to move down. The wire $f$ is held taut between the arms $g$ which are fitted to the shaft $i$ journaled in the arms $h$. On this shaft is further fitted a lever $k$, the free end of which is linked by means of a pin $k^1$ to a slotted bar $m$, which is pressed by action of a spring and a pin $n$ in the slot $m^1$ against a stationary column $o$. The arms $h$ are fitted to the rods or lifters $p$ which are displaceably fitted in the frame $e$. The frame $e$ stands on the main body $e^1$ of the machine and through the same frame $e$ runs the conveyer belt $a$. The rods $p$, which are guided at $e^2$ in the body of the machine are coupled below by a cross bar $p^1$, to which a lever $r$ is linked, which is journaled at $r^1$ in the body of the machine. To the lever $r$ it fitted a roller $r^2$ which bears against a cam disk fitted on the shaft $c$. To the arms $h$ is secured a strap $s$, by which the stroke of the lever $k$ projecting through it is limited. When thus the cutting wire $f$ is moved downward by the downward stroke of the bars $p$, it severs a piece of butter from the bar. As soon as the wire has reached the conveyer belt, two plate grippers $t$ seize the piece of butter cut off, push it quickly away from the bar of butter and move it to the wrapping mechanism. These gripper plates $t$ are fitted to arms $t^1$, which project through guides $t^2$ and are at their ends secured by means of pins $t^3$ pivotally to a slide $t^4$.

To the slide $t^4$ sliding in guides $t^{13}$ alongside of the conveyer belt, is fitted a link $t^5$ which is coupled to a bell-crank $t^6$ journaled on the body of the machine. The other arm of this crank bears a roller $t^7$ which rides on a cam disk fitted to shaft $c$. The guides $t^2$ are pivotally fitted to the arms $t^8$, which are fitted to vertical revoluble shafts $t^9$. These shafts have below arms $t^{10}$, to the ends of which rollers $t^{11}$ are fitted, which ride on cam disks on the shaft $c$. By the rotation of the shafts $t^9$ the guides $t^2$ and with them the gripper plates approach each other, and bear against the piece of butter which has been cut off. Then the slide $t^4$ and with it the grippers advance and take the piece of butter into the wrapping mechanism, which may be of any of the known kinds. Then the arms $t^8$ are rocked back and thereby the gripper plates are moved apart and back again by means of the lever $t^6$. At the same time with the advance of the gripper plates the bars $p$ rise again and the bar of butter is again advanced by the conveyer band being advanced by the pawl $a^3$.

When the bars $p$ move upward, the column $o$ will hold back the bar $m$ owing to the friction caused by the spring pressure, so that the lever $k$ is turned on its pin $k^1$ until it strikes against the underside of the strap $s$. The cutting wire will thus be first advanced a little in the direction of the feed of the bar of butter and then only upward, as now the lever $k$ abutting against the strap $s$ will push the bar $m$ upward along the pin $n$ overcoming the friction. The arms $g$ are thus raised in an oblique position until the pin $n$ has reached below the slot $m^1$. When then, at the next cutting operation, the arms $h$ move downward again, the bar $m$ will be held back until the lever $k$ strikes above against the strap $s$ and thus the arms $g$ are again in a vertical position. In this position the bar $m$ is then again drawn so that the cutting wire moves downward in a vertical line. These movements of the grippers $t$, the wire $f$ and the bar of butter $b$ are so dimensioned, that they occur at a graduated velocity as hereinbefore described. Thereby it is obtained, that these parts are immediately separated from each other and return without any loss of time into their respective positions for the next operations. Thus a very rapid working is enabled by this arrangement.

To the strap $s$ is further fitted a set screw $u$ serving as the upper stop for the lever $k$. By means of this screw the length of the piece of butter to be cut off may be easily regulated, as by its adjustment the cutting wire may be made to move vertically downward at a position which is either more to the one or more to the other side. In the one instance shorter, in the other instance longer pieces of butter will be cut off.

I claim:

1. Arrangement for severing single pieces from a bar of butter by means of a cutting wire comprising means for quickly removing the severed piece, immediately after the severing operation from the bar of butter and conducting it to the wrapping mechanism, means for rocking the cutting wire at a slightly smaller velocity in the direction of the feed and then raising it, and means for advancing the bar of butter at a still smaller velocity.

2. A butter cutting apparatus, comprising a feed apron adapted to receive a bar of butter, a slide adapted to arrest said bar, a reciprocable and oscillable wire, adapted to sever a piece of butter from the bar, and means for feeding said severed piece away from the bar.

3. In a butter cutting device, a cutter, an oscillable arm carrying said cutter, a reciprocable member to which the arm is pivoted, a strap secured to said member, a lever secured to the arm and adapted to engage the strap, a spring-influenced bar linked to the lever, and an abutment adapted to be frictionally engaged by said bar.

In testimony whereof I have hereunto set my signature in the presence of two subscribing witnesses.

EMIL JAGENBERG. [L. S.]

Witnesses:
ALBERT NUFER,
HELEN NUFER.